Dec. 26, 1967  A. J. RAMSAY ET AL  3,360,636
APPARATUS FOR PROVIDING A VISUAL RECORD OF
THE INTEGRAL OF AN ELECTRICAL SIGNAL
Filed May 6, 1964  5 Sheets-Sheet 3

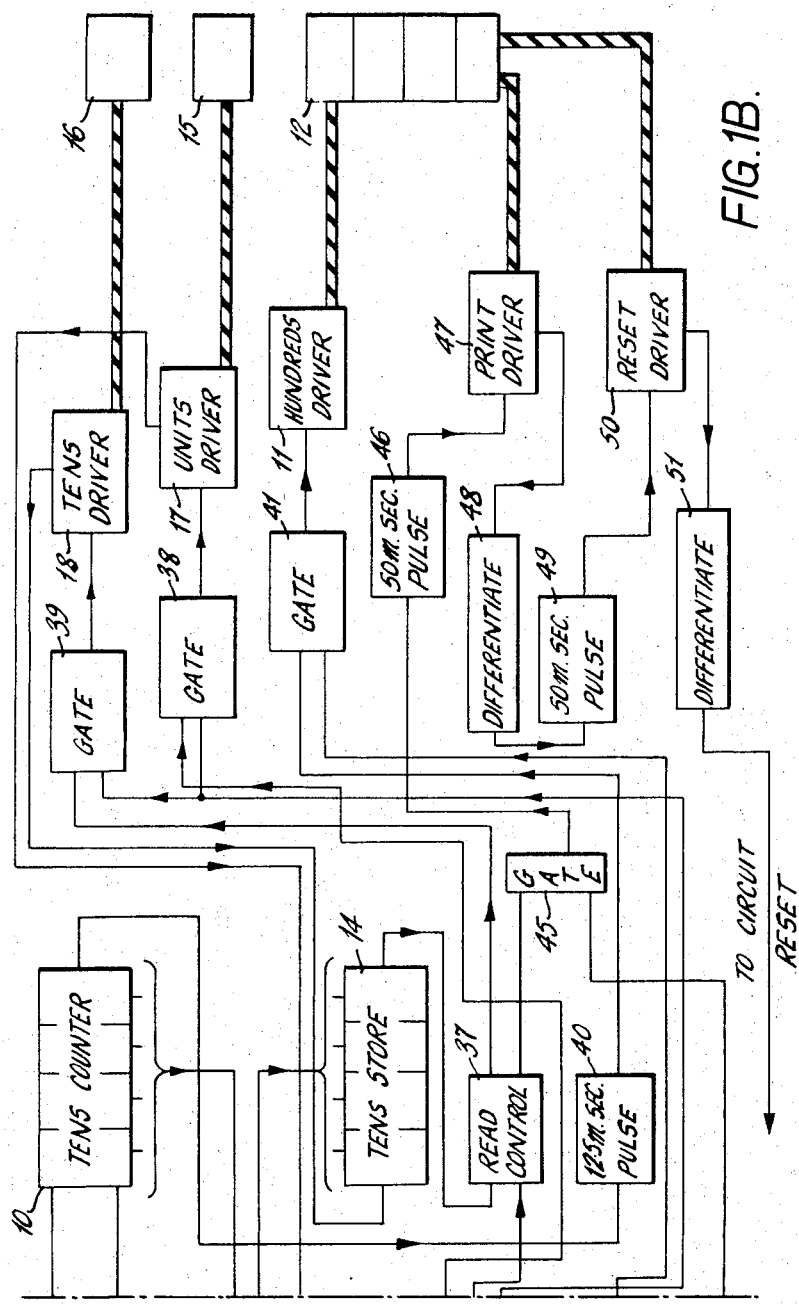

INVENTORS
ALAN JAMES RAMSAY
WILLIAM KELVIN BOTTOMLEY

BY
ATTORNEY

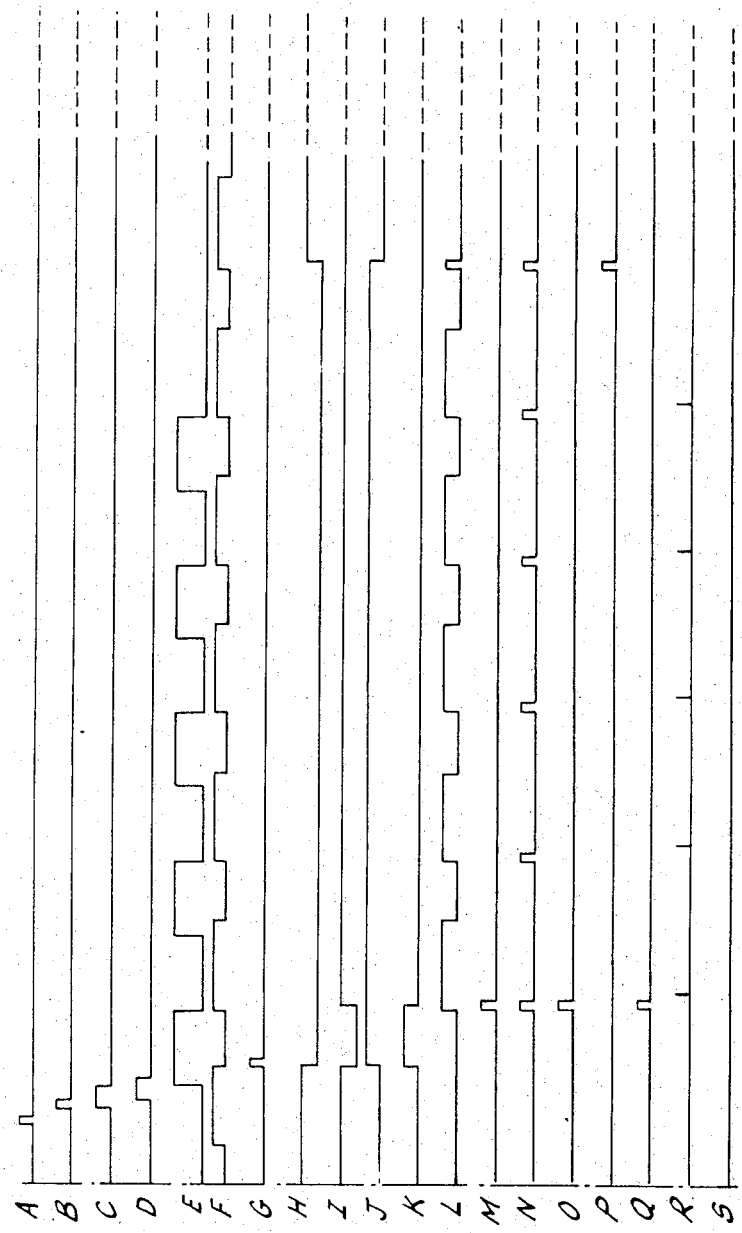

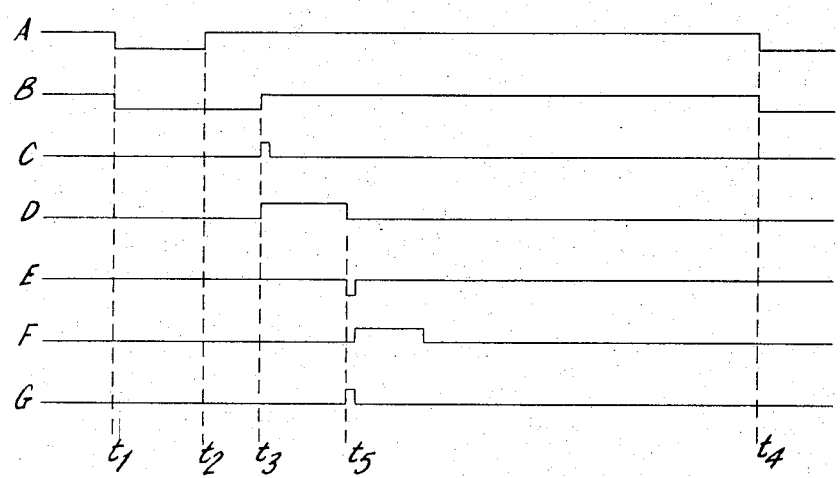

United States Patent Office 3,360,636
Patented Dec. 26, 1967

3,360,636
APPARATUS FOR PROVIDING A VISUAL
RECORD OF THE INTEGRAL OF AN
ELECTRICAL SIGNAL
Alan J. Ramsay, Bothwell, Glasgow, and William Kelvin
Bottomley, Hamilton, Scotland, assignors to Minneapolis-Honeywell Regulator Company, Minneapolis,
Minn., a corporation of Delaware
Filed May 6, 1964, Ser. No. 365,354
Claims priority, application Great Britain, May 10, 1963,
18,506/63
8 Claims. (Cl. 235—92)

ABSTRACT OF THE DISCLOSURE

Apparatus wherein a converter produces a pulse train of a frequency dependent upon the magnitude of the signal to be integrated. The number of pulses in the train is counted by a combination of electric counters for the least significant digits of the counted number and a mechanical number wheel counter for the remaining digits. Counting continues until a timing pulse is produced, at which time the numbers in the electric counters are transferred to corresponding storage devices and the counters are re-set. Number wheels are then set in accordance with the numbers in the storage devices, a composite record is made of the settings of these wheels and of those of the mechanical counter, and all wheels are then re-set. The timing pulses may be produced upon the occurrence of zeros, maxima, or minima in the signal.

---

Figure 1A:
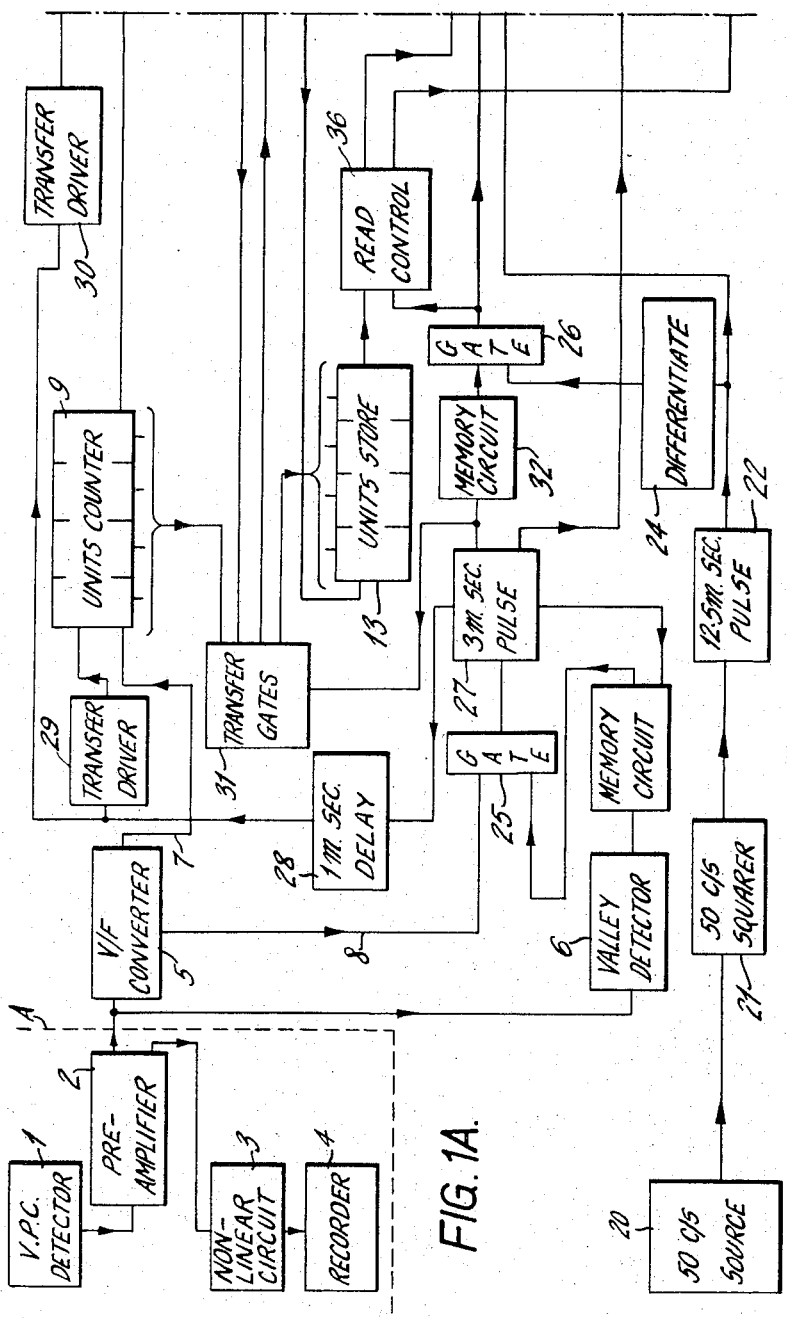

The present invention relates to apparatus for providing a visual record of the integral of an electrical signal. In particular, the invention is concerned with providing apparatus capable of determining the integral with respect to time of an electric signal which apparatus is capable of responding to timing pulses and of providing a visual record of the value of the integral during each of the periods between successive timing pulses. The timing pulses may be randomly or regularly recurrent and in some cases may be generated within the apparatus in response to a recurrent and detectable feature of the electric signal.

According to the present invention there is provided apparatus comprising means for generating a train of pulses the recurrence frequency of which is representative of the magnitude of an applied signal, a source of timing pulses, means for counting the number of pulses in said train and means responsive to a timing pulse to create a visual record of the number of pulses counted up to the time of occurrence of that timing pulse and for resetting the counting means to a datum condition so as to enable it to start counting the pulses subsequently generated. The timing pulses generated by said source may be randomly or regularly recurrent.

The counting means may comprise separate electric counters for registering each of the $n$ least significant digits of the number counted, $n$ being a small integer, and a mechanical counter for registering the remaining digits. The means for creating a visual record may then include the mechanical counter together with $n$ further number wheels similar to those of the counter, means responsive to a timing pulse for positioning each of the further number wheels in accordance with the number registered at the time of the pulse concerned by a corresponding one of the electric counters and means for creating a visual record of the numbers then registered by the mechanical counter and the further wheels.

Said means for creating a visual record may simply comprise means for recording an imprint of the numbers registered, for example on a continuous strip of paper, which, together with a carbon paper strip, is pressed against the number wheels by print hammers or the like at the time that it is required to make a printed record.

Further, said responsive means may include $n$ number stores, means for transferring the counts in each of the electric counters to a corresponding one of the stores and simultaneously resetting the electric counters to datum conditions and means operative at a first interval after the timing pulse for setting up the further number wheels in accordance with the numbers transferred to the corresponding stores and for resetting the stores to datum conditions, said means for creating a visual record being brought into operation after a second interval longer than the first but less than the time taken for said pulse generating means to generate $p^n$ (where $p$ is the radix of counting) pulses at the maximum possible rate.

A combination such as that set out in the preceding two paragraphs may be conveniently employed for example where the maximum pulse rate which may occur, is higher than that which can be accepted by a given mechanical counter. A number of the least significant digits are therefore counted by electric counters, e.g. shifting registers employing for example valve, transistor or magnetic core circuits, or multiple gap discharge tube counters, whilst the mechanical counter receives an input the maximum rate of which is a sub-multiple ($1/p^n$) of the maximum pulse rate. The number $n$ may conveniently be one or two. Where the maximum pulse rate lies in the range of 10,000–100,000 pulses/min. the maximum counting rate for the mechanical counter with $n$ equal to two would not be greater than 1,000 pulses/min. This would permit the employment of a comparatively simple and cheap mechanical counter.

In some cases, the source of timing pulses may include a feature detecting circuit, means for applying the electric signal to the feature detecting circuit and means for generating a feature pulse (a particular class of timing pulse) on detection of a particular recurrent feature in the signal. The features might for example be zeros or the occurrence of some other datum level, maxima or minima.

In a particular application of apparatus according to the present invention it is arranged for coupling to the output detector (signal generator) of a vapour phase chromatography apparatus and includes means for generating a train of pulses the recurrence frequency of which is representative of the magnitude of any signal generated by the output detector, means to which the output of the output detector is applied, for generating a valley pulse on detection of and substantially coincident with any point in the applied signal at which it ceases to decrease having previously been doing so, means for counting the number of pulses in said train and means responsive to a valley pulse to create a visual record of the number of pulses counted up to the time of occurrence of the valley pulse and for resetting the counting means to a datum condition so as to enable it to start counting the pulses subsequently generated.

Further, the present invention provides in combination a vapour phase chromatography apparatus having an output detector for providing an output signal of varying magnitude and apparatus as defined in the preceding paragraph. The combination may further include means for recording a representation of the manner in which the output signal varies with time.

Figure 2A:
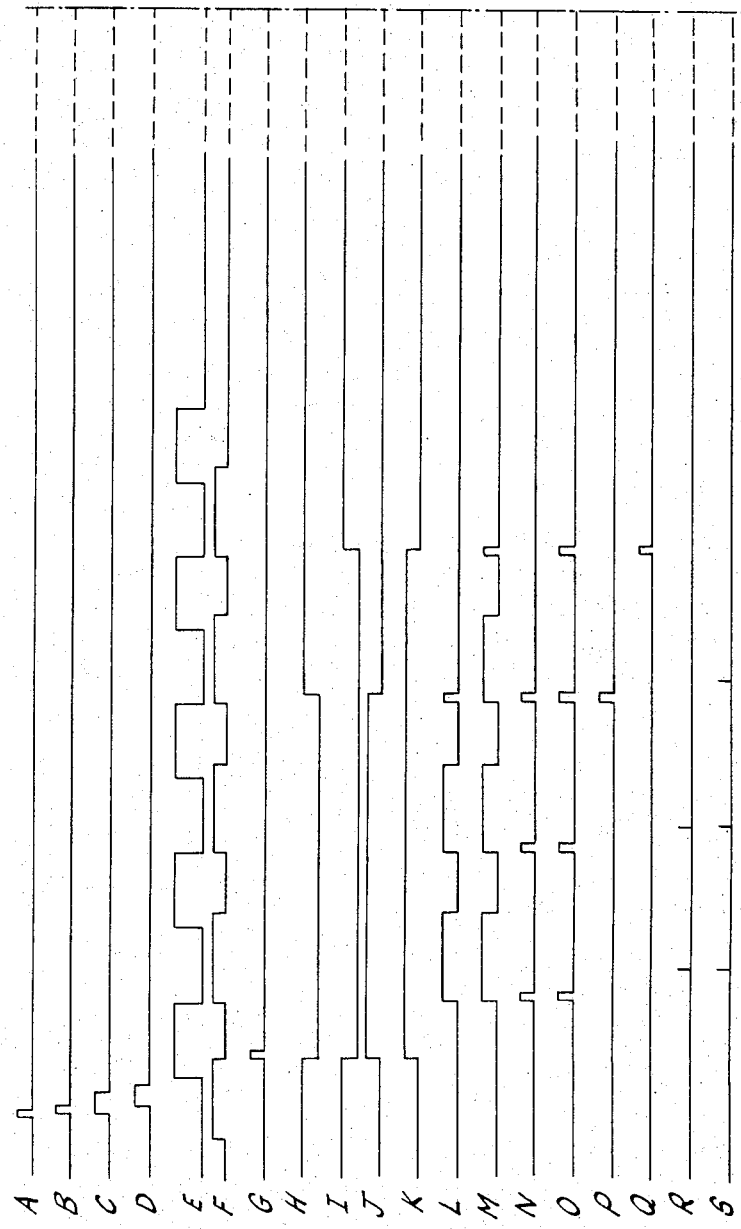

An apparatus according to the present invention will now be described by way of example with reference to the accompanying drawings in which:

FIGURES 1A and 1B together constitute a block circuit diagram of the apparatus and FIGURES 2A and 2B and 3 show waveforms illustrating the operation of the apparatus shown in FIGURE 1.

The apparatus to be described is intended for use in conjunction with a vapour phase chromatography (V.P.C.) apparatus. The latter apparatus is used in the analysis of mixtures of compounds and provides a D.C. output signal, the magnitude of which varies with time in a well-known and characteristic manner, having peaks corresponding to the difference compounds in the mixture. In some cases the peaks are separated along a baseline corresponding to zero output but in other cases some of them may be incompletely separated giving sharp minima, not necessarily at zero signal level, between the trailing edge of one peak and the front edge of the next. The relative proportions of the different compounds may be determined by measuring the areas under the different peaks. The present apparatus is designed to accept, as an input signal, the output signal of a V.P.C. apparatus and automatically to produce a printed record of the value of the area under each peak of the applied signal. The apparatus may of course include a conventional recorder which is coupled to the same input signal, for producing a record of the variation of the input signal.

As shown in FIGURE 1, a V.P.C. detector 1 of conventional form provides an output signal in the form of a D.C. current varying in magnitude in the range $10^{-10}$ to $10^{-7}$ amps. This is fed to a pre-amplifier 2, for example a transistor chopper amplifier, one output of which is fed through a non-linear circuit 3 to a conventional pen-recorder 4. The circuit 3 is arranged to have a characteristic, for example a logarithmic characteristic, such as to facilitate recording of the input signal despite the wide range of variation in amplitude. A second output from the pre-amplifier 2 is fed to apparatus for providing a visual record of the areas under the signal peaks, the different parts of that apparatus being shown to the right and below the dotted line A in FIGURE 1.

In said apparatus, the signal from the pre-amplifier 2 is fed both to a so called voltage/frequency converter or V/F converter 5 and a valley detector 6. A V/F converter is a circuit for producing an output pulse train the recurrence frequency of which at any moment represents the magnitude of an applied voltage. Typically, the converter 5 may be basically a variable frequency relaxation oscillator the frequency of which is controlled in accordance with the input signal. The required train of pulses is derived from the output of this oscillator in known manner. The converter 5 in fact has two outputs 7 and 8, the pulses appearing at output 8 being in advance, 4.5 milliseconds, of those appearing at output 7. This may be achieved for example by deriving the more advanced output directly from the oscillator output, for example by differentiation, and deriving the later one from a delay circuit having a delay time of 4.5 milliseconds, for example a monostable circuit which is triggered by pulses coincident in time with the pulses of the more advanced output.

The valley detector 6 operates to produce a positive output pulse on each occasion that the input signal, having previously been decreasing, ceases to do so. This it must do regardless of the level at which the minimum occurs as many instances occur in vapour phase chromatography where one or more peaks are not completely separated and the minimum occurs at quite a high signal level. A valley pulse is thus generated at the end of any peak which is completely separated from the next following one and at the "intersection" of a pair of incompletely separate peaks. The detector 6 must provide its output pulses at the instants at which the input ceases to fall, since the succeeding increase may not appear for some time afterwards, if the next peak is completely separate, or at all, if the peak concerned is the last of a particular analysis. The output pulses of the detector 6 will be referred to as valley pulses and constitute in this particular apparatus the feature pulses referred to previously in this specification and in the claims being produced on detection of a randomly recurrent feature i.e. the end of a peak in the output signal of the V.P.C. detector 1. An example of a valley pulse detector is disclosed in the copending application of Alan J. Ramsay, Ser. No. 368,505, filed May 19, 1964.

The output 7 of the converter 5 is fed to the input of a conventional four stage binary electric counter 9 connected automatically to reset to a datum number six i.e. 0110 in binary notation and provide an output pulse on reaching a count of 16 i.e. when the counter has received ten pulses. The output pulses of the counter 9 are fed to the input of a second identical counter 10, the output of which is fed through circuits to be described to the input driving mechanism referred to as the hundreds driver 11 of the first stage of a simple mechanical printing counter 12. This may for example be a conventional counter with number wheels and a print out mechanism which can be actuated at any time to produce a printed record of the number registered by the counter, for example on a paper strip which is fed through the printing mechanism. The counter should also include a separately operable reset mechanism for setting all the wheels to zero. It will be appreciated that the counter 12 will be actuated on generation of every hundredth pulse by the converter 5. Therefore, if the counter 12 can operate at a rate of 3000 counts per minute, the maximum pulse rate produced by the converter 5 may be as much as 300,000 pulses per minute. In this particular instance a maximum pulse rate of 10,000 pulses per minute is employed. The counters 9 and 10, particularly the counter 9, are of course required to operate at correspondingly higher pulse rates than the counter 12 and must be suitably designed. Each may for example, include in known manner a series of four bi-stable transistor or magnetic core circuits arranged as a binary counter with the required datum, output and reset facilities provided in known manner. The counters 9 and 10 are referred to respectively as the units counter and the tens counter.

The apparatus operates, in outline, to count the number of pulses occurring between each pair of valley pulses. On the occurrence of a valley pulse therefore the counts in each of the counters 9 and 10 are immediately transferred to corresponding units and tens stores 13 and 14 and the counters 9 and 10 are at the same time reset to zero to enable them to start counting the pulses corresponding to the next signal peak when it occurs. Subsequently the stored numbers are used to set up additional units and tens number wheels 15 and 16 where are associated with the mechanical counter 12 as units and tens wheels respectively but are provided with separate input driving mechanisms referred to as the units and tens drivers 17 and 18. When these wheels 15 and 16 are set up, the number registered by all the wheels as a whole is printed and the wheels are then all reset to zero. This must occur within a period after the valley pulse initiating it which is less than the time taken for the converter 5 to generate one hundred pulses at the maximum possible rate, otherwise the counter 12 may have changed from the correct value and in addition the succeeding count will be inaccurate. The remainder of the circuits shown in FIGURE 1 are concerned with the actuation and control of the operations described in outline in this paragraph.

To provide a timing basis, a 50 c./s. mains source 20 is connected to the input of a squaring circuit 21 the substantially square wave output of pulse generator 22 arranged to produce 12.5 millisecond negative going pulses the leading edges of which coincide with the negative going steps of the applied square wave. The pulses therefore recur at 20 millisecond intervals. The generator 22 may for example be a conventional monostable trigger circuit arranged to be triggered to its unstable state by the negative going steps of the square wave and to revert after 12.5 milliseconds.

A pair of gate circuits 25 and 26 are connected to the output of a memory circuit 23 controlled by the valley detector 6, the more advanced output 8 of the converter 5 and the output of a differentiating circuit 24 coupled to the output of the pulse generator 22 and arranged to produce a pulse coincident with the trailing edge of each of the 12.5 millisecond pulses.

Gate circuit 25 produces an output pulse the leading edge of which is coincident with the first pulse on output 8 which occurs after or has a leading edge coincident in time with a valley pulse. This is controlled by the memory circuit 23 which responds to an applied valley pulse to apply a conditioning voltage to open the gate circuit 25. It may for example be a bistable trigger circuit which is triggered to a particular one of its two states by a valley pulse and then applies the necessary conditioning voltage to the gate circuit 25.

The output of the gate circuit 25 is applied to a three millisecond pulse generator circuit 27 the output of which will be referred to as transfer pulses. The output of generator 27 is fed back to the memory circuit 23 to reset it to its original state.

The timing of the transfer pulses ensures that their leading edges always occur 4.5 milliseconds before a pulse on the output 7 of the converter 5. The transfer pulses are applied to transfer driver circuits 29 and 30 for the counters 9 and 10 through a 1 millisecond delay circuit 28 so that their leading edges after that delay cause the numbers registered in them to be transferred to the stores 13 and 14 and the counters themselves to be reset to their datum conditions of six. The period of 4.5 milliseconds is determined so that these operations can be completed before the corresponding pulse on output 7 reaches the inputs of the counters 9 and 10. In this way it is ensured that the transfer cannot take place whilst a change of count is in progress and also that the pulses adjacent to the valley are allocated to the correct peaks.

The transfer pulses are also applied directly without any delay to an array of transfer gate circuits 31 connected between the corresponding stages of the counters 9 and 10 and the stores 13 and 14. The gates isolate the stores 13 and 14 from the counters 9 and 10 except during a transfer pulse when they couple them so that any change of state occurring in a stage of either counter causes the corresponding store stage to change state. Thus when the transfer and reset drive is effective 1 millisecond after the gate circuits 31 are opened, the required transfer is effected as described below. As indicated in FIGURE 1, the circuits 31 are coupled by quadruple leads to the counters 9 and 10 and the stores 13 and 14 and are an array of eight gate circuits within the simple block shown all controlled by the one input.

The output of the pulse generator 27 is also applied to a memory circuit 32 for controlling the gate circuit 26 to open, following a transfer pulse. Gate circuit 26 then operates to produce an output pulse, to be referred to as a "read" pulse, coincident with the first pulse produced by differentiating circuit 21, after a transfer pulse has occurred. Each read pulse thus occurs at some time after the transfers from the counters 9 and 10 to the stores 13 and 14 and also, by virtue of the operation of the differentiating circuit 24, at the end of the 12.5 millisecond timing pulse.

The stores 13 and 14, like the counters 9 and 10 are conventional binary counters. They are however, arranged to have a datum condition which is the complement of that of the counters 9 and 10, i.e. nine or 1001 in binary notation and to produce an output pulse when the most significant digit changes from "1" to "0". The stores have a conventional feed forward from the second to the fourth stages so that on receipt of a further pulse after reaching a count of nine i.e. 1001 in binary, the count resets to "0010" instead of "1010" due to the feed forward, i.e. to two rather than ten. This is the only operating circumstance in which the most significant digit changes from "1" to "0" and in which an output pulse is produced. It occurs on reaching what would otherwise be a count of ten. In addition, the transfer from the counters 9 and 10 is arranged to subtract from the number stored at the time of transfer which is always 9 since it is arranged, as described below, that the stores are always in their datum condition at this time. The transfer may be effected quite simply by resetting the counter 9 or 10 to its datum condition and passing a pulse from any stage which changes state from "1" to "0" in the process, through the gate circuits 31 to the corresponding stage of the store 13 or 14 to change its state.

It will be seen from this that, in order to produce an output pulse after a transfer has occurred, either store 13 or 14 will need to have applied to it a number of pulses equal to the number transferred plus one, since the number transferred is subtracted from nine and an output is produced on reaching ten. These pulses are generated in a manner to be described and are used at the same time to actuate the units and tens drivers 17 and 18 provided for positioning the number wheels, 15 and 16. The drivers 17 and 18 and their associated circuits operate so that the wheels 15 and 16 are stepped $n$ positions in response to ($n+1$) pulses. The wheels 15 and 16 which are always previously set to zero, are therefore set up as required to the numbers corresponding to the number transferred from the counters 9 and 10 to the stores 13 and 14. The drivers 17 and 18, like the hundreds driver 11 for the counter 12, each include the actuating coil of an electro magnetic stepping mechanism, the mechanical output of which is indicated by a chequered connection, in FIGURE 1. Each may for example include simply an actuating coil connected in the collector circuit of a transistor which is normally non-conducting. Application of a suitably polarised pulse to the base of the transistor switches it on, allowing current to flow through the coil. This current must last for a minimum period, about 10 milliseconds, for the mechanism to be energised so as to complete a step. The drivers 11, 17 and 18 may each further include one or more amplifier stages for converting applied pulses derived from other circuits to pulses of suitable amplitude. The drivers 17 and 18 also include differentiating circuits coupled to a suitable point in them to provide short duration output pulses, coincident with the leading edges of the pulses applied to the coils. These outputs are connected back to the counting inputs of stores 13 and 14 where any pulses applied cause the store to add one to the count stored in it.

The pulses applied to the driver 11 are generated by a 12.5 millisecond pulse generator 40 which is coupled to the output of the counter 10 and generates a drive pulse for each output pulse from the latter. The drive pulses pass through a gate 41 to the driver 11, the gate being controlled by transfer pulses from generator 27 to close during a transfer and prevent any possibility of a false input to counter 12 during a transfer.

The pulses applied to the drivers 17 and 18 are derived from the 12.5 millisecond pulse generator 22. These pulses are applied to the inputs of gate circuits 38 and 39 which are respectively controlled by read control circuits 36 and 37 which are for example bi-stable trigger circuits. The read control circuits have two inputs each, one each to which read pulses are applied from gate circuit 26 and one each coupled to the output of the corresponding one of stores 13 and 14. The circuits 36 and 37 are arranged to be switched to their first states by output pulses from stores 13 and 14 and to their second states by read pulses. Each circuit 36 and 37 controls the condition of the respective one of the two gate circuits 38 and 39 so that the latter are open when the bi-stable circuits 36 and 37 are in their second states and closed when they are in their first states. As a result, the gate circuits 38 and 39 are opened following a read pulse to allow subsequently generated pulses from generator 22 pass to the drivers 17 and 18.

Considering for the moment only the units wheel 15, together with store 13 read control circuit 36, gate circuit 38 and driver 17 each full pulse applied to driver 17 will cause the wheel 15 to step one position in the increasing direction. Each pulse also produces a short pulse from the differentiating circuit in driver 17 which is applied back to the store 13. The store 13 will already have been set to (9−n) where n was the number in counter 9 at the time of the transfer concerned and the pulse applied to it will increase the number stored by one. It should be realised here that the timing of the read pulses from gate circuit 26 ensures that a transfer is completed and that the end of any pulse from generator 22 which happen to overlap with the transfer is allowed to pass, before the gate circuit 26 is opened. This process will be repeated for each pulse generated by generator 22 until the number in store 13 reaches 9, when the next pulse applied to the store 13 will produce an output pulse which returns the read control circuit 36 to its first state, closing the gate circuit 38. This action occurs during the $(n+1)$th pulse produced by generator 22 and at a time such that the closing of gate circuit 38 cuts short the pulse at its output so that its duration is insufficient to cause the stepping mechanism in driver 17 to be operated in response to that pulse. As a result of this store 13 will have reached a count of ten and will have reset to two due to the feed forward, the read control circuit 36 will be in its first state with gate circuit 38 closed (the condition required until the next transfer pulse is generated), and the number wheel 15 will have been moved n positions, i.e. to the position corresponding to the number in counter 9 at the time of the transfer pulse. A like condition will similarly be reached with number wheel 16 and store 14, except that the wheel 16 will have been moved n1 positions to the number that was registered by counter 10. It should be noted that if either n or n1 is zero, transfer will leave the appropriate store 13 or 14 registering 9 and the corresponding bi-stable circuit 36 or 37 will be switched back to its first state by the first pulse from the generator 22 without moving the corresponding number wheel 15 or 16, since this first pulse will be cut short by the reclosing of gate circuit 38 or 39.

FIGURE 2 shows waveforms illustrating the operation described with reference to FIGURE 1 following the generation of two successive transfer pulses, the counters 9 and 10 registering the numbers 32 and 05 at the times concerned. The waveforms are all shown in two parts separated by a dotted section representing part of the interval between the successive valley pulses.

In FIGURE 2, waveform A is the output of valley detector 6 whilst waveform B is the output of gate circuit 25 assumed to coincide with the first pulse (not shown) from converter 5 subsequent to the valley pulse. Waveform C shows the 3 millisecond pulses generated by generator 27 and applied to the transfer gates 31 and waveform D the same pulses delayed one millisecond by circuit 28 before application to the transfer drivers 29 and 30. Waveform E is that appearing at the output of circuit 21 and is arbitrarily timed with respect to waveforms A–D. Waveform F is the output of pulse generator 22. Waveform G is the output of gate circuit 26 and this coincides with the end of the first pulse of waveform F following the end of a pulse in waveform C.

Waveforms H, I, J and K show the states respectively of read control circuits 36 and 37 and the gate circuits 38 and 39. Waveform L shows the input to drive 17 which, since counter 9 registered 2 at the time of the first transfer pulse, consists in its first part of two complete pulses from waveform F and one which is cut short. Waveform N shows the pulses applied to store 13 from drive 17 and waveform P the output from store 13 on reaching zero, this resetting circuit 36 to its first state and closing gate 38 to cut short the third pulse in waveform L. Waveforms M, O and Q are the similar ones for drive 18 and store 14, the number of pulses in the first part of waveform M being three complete ones and one which is cut short, since counter 10 registered three. In the second halves of waveforms L, M, N and O, the number of pulses differ since at the time of the valley pulse concerned counter nine registered five and counter 10 zero. The second part of waveform L therefore includes five complete pulses and one short one whereas that of waveform M is only one short one, since the first pulse causes store 14 which was at 7 after transfer to change to eight and produce an output pulse.

Waveforms R and S represent the steps of number wheels 15 and 16 and it will be seen that these occur only in response to the full length pulses in waveforms L and M and not the short ones.

The final operations required are the actuation of the print mechanism after wheels 15 and 16 have been set up and finally resetting of the counter 12 together with the wheels 15 and 16 have been set up and finally resetting of the counter 12 together with the wheels 15 and 16 to zero, resetting of stores 13 and 14 to their datum conditions of nine and resetting of various bi-stable circuits such as memory circuit 32 which do not otherwise get reset. In fact, as a precaution against false operation, all bi-stable circuits have reset pulses applied to them to ensure they are all in their datum conditions immediately following each operation of resetting the counter 12 and the number wheels 15 and 16.

Printing is required to occur only when both wheels 15 and 16 have been set up. When this has occurred both the read control circuits 36 and 37 will have been reset to their first states having been in their second states while the wheels 15 and 16 are being set up. The read control circuits 36 and 37 therefore have second outputs which are connected to a gate circuit 45 arranged to produce a short output pulse at the time that the second of the read control circuits 36 and 37, whichever may be, returns to its first state, the other having already adopted that state. This output pulse is applied to a 50 millisecond pulse generator 46, for example another monostable trigger circuit. The output of the generator is applied to the print driver circuit 47 for the printing counter 12. This is similar to the drivers 11, 17 and 18, except only for the longer length of pulse required to complete a printing action, and its mechanical output is applied to the printing mechanism of the counter 12.

In addition, an electrical pulse output from the driver 47 passes to a differentiating circuit 48 which produces a short output pulse coincident with the end of each print drive pulse. The output pulses from circuit 48 are applied to a second 50 millisecond pulse generator 49 the output of which is applied to a reset driver circuit 50 which actuates the resetting mechanism for the printing counter 12 and is similar to the print driver circuit 47. The reset driver circuit 50 also provides an electrical output which is applied to a differentiating circuit 51 to produce a short pulse coincident with the beginning of each reset drive pulse. The output from the circuit 51 is passed back by connections not shown to the reset inputs of the stores 13 and 14 to reset them to their datum condition and to the reset inputs of memory circuit 32 and the read control circuits 36 and 37.

FIGURE 3 shows waveforms illustrating the operation of circuits 36, 37, 45, 46, 48, 49 and 51 during a period from just before one transfer pulse to just after another. Waveforms A and B represent the states of circuits 36 and 37, both changing to their second state on the occurrence of a transfer pulse at times $t_1$ and $t_4$ and returning to their first states at time $t_2$ and $t_3$ respectively when stores 13 and 14 change from nine to two (these times are assumed to be different but could of course coincide if the digits were identical). Waveforms C and D represent the output of circuit 45 a pulse at the time that both circuits 36 and 37 have reverted to their first states. This leads to the production at time $t_3$ of a 50 millisecond pulse by generator 46 (waveform D) which cases a printing operation. The trailing edge of the pulse from generator 46 gives a pulse from differentiating circuit 48 (waveform E) at time $t_4$ which triggers the generator 49 to produce a 50 millisecond pulse (waveform F) also at time $t_4$ for resetting the counter 12. Finally, differentiating circuit 51 produces an output pulse for resetting the stores 13 and 14 and other circuits.

What we claim is:

1. Apparatus for providing a visual record of the integral of an electric signal, comprising means for generating a train of pulses the recurrence frequency of which is representative of the magnitude of an applied electric signal, a source of timing pulses, means for counting the number of pulses in said train, said counting means including $n$ counters each for separately registering a corresponding one of the $n$ least significant digits of the number counted, $n$ being a small integer, and a serially operating counter for registering the remaining digits, $n$ storage devices associated one with each of the $n$ counters, and means responsive to a timing pulse from said source operative first to transfer to the associated storage devices numbers representative of the numbers registered in the $n$ counters and to re-set the $n$ counters to their datum conditions, and second, at some predetermined interval after said transfer, to actuate means for creating a visual record of the number of pulses counted up to the time of occurrence of the timing pulse and then re-setting the storage devices and the serially operating counter to their datum conditions, said record being derived from the numbers stored in the storage devices and the number registered in the serially operating counter.

2. Apparatus according to claim 1 in which the $n$ counters are electric counters and the serially operating counter is a mechanical counter having number wheels.

3. Apparatus according to claim 1 in which the $n$ counters are connected serially with one another and with the input to the serially operating counter.

4. Apparatus according to claim 3 in which the means for creating a visual record includes the mechanical counter together with $n$ further number wheels similar to those of the mechanical counter, means for setting up the further number wheels in dependence upon the numbers stored in respective ones of the storage devices, and means for recording the numbers registered both by the further number wheels and mechanical counter.

5. Apparatus according to claim 4 in which the further number wheels are positioned adjacent to those of the mechanical counter and said means for recording the numbers registered comprises means for printing out together the numbers registered by the further wheels and the mechanical counter, the arrangement of the further number wheels relative to the counter being such that the digits printed are presented in conventional digit order.

6. Apparatus according to claim 1 in which the source of timing pulses includes a circuit for detecting a selected feature in said electric signal, means for applying the electric signal to the feature detecting circuit and means for generating a feature pulse, a particular class of timing pulse, on detection of a particular recurrent feature in the signal.

7. Apparatus according to claim 1 in which said means for creating a visual record comprises means for printing a numerical value onto a strip or sheet of paper.

8. Apparatus according to claim 1 wherein said electric signal is derived from the output of a detector of a vapour phase chromatography apparatus and which includes a feature detecting circuit to which the electric signal is applied in operation, for generating a valley pulse on detection of and substantially coincident with any point in the applied electric signal at which the latter ceases to decrease having previously been doing so, the valley pulses being utilized as the timing pulses required for application to said means for creating a visual record whereby in operation a visual record is created of the integral under each of the successive peaks of the output from the detector of the vapour phase chromatography apparatus.

References Cited

UNITED STATES PATENTS 3,185,820   5/1965   Williams _____ 235—92

MAYNARD R. WILBUR, *Primary Examiner.*

G. J. MAIER, *Assistant Examiner.*